(12) United States Patent
Hoffman et al.

(10) Patent No.: US 8,787,422 B2
(45) Date of Patent: Jul. 22, 2014

(54) DUAL FIXED GEOMETRY FAST FOURIER TRANSFORM (FFT)

(75) Inventors: Marc M. Hoffman, Boxborough, MA (US); Ajay Anant Ingle, Austin, TX (US); Mao Zeng, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/323,917

(22) Filed: Dec. 13, 2011

(65) Prior Publication Data

US 2013/0148694 A1 Jun. 13, 2013

(51) Int. Cl.
*H04B 1/692* (2011.01)

(52) U.S. Cl.
USPC .......................... 375/131; 375/260; 375/259

(58) Field of Classification Search
USPC .......................... 375/260, 259, 131
See application file for complete search history.

(56) References Cited

U.S. PATENT DOCUMENTS

| | | | |
|---|---|---|---|
| 5,297,070 A | 3/1994 | Hua et al. | |
| 5,978,825 A * | 11/1999 | Divine et al. | 708/525 |
| 6,609,140 B1 | 8/2003 | Greene | |
| 7,062,523 B1 | 6/2006 | Hoffman et al. | |
| 7,822,156 B2 | 10/2010 | Aytur et al. | |
| 2003/0076875 A1 * | 4/2003 | Oates | 375/147 |
| 2004/0039765 A1 * | 2/2004 | Nakazuru et al. | 708/404 |
| 2005/0278405 A1 | 12/2005 | Jaber | |
| 2006/0010188 A1 | 1/2006 | Solomon et al. | |
| 2010/0191791 A1 | 7/2010 | Patel et al. | |
| 2011/0028859 A1 * | 2/2011 | Chian | 600/554 |
| 2012/0177156 A1 * | 7/2012 | Hauske et al. | 375/343 |

OTHER PUBLICATIONS

Yang, Dong et al. "Temporal Filtering Using Time Lenses for Optical Transmission Systems," Optics Communications, vol. 281, No. 2, Jan. 2008, pp. 238-247.

Zapata, E.L. et al. "Application-Specific Architecture for Fast Transforms Based on the Successive Doubling Method," IEEE Transactions on Signal Processing, vol. 41, No. 3, Mar. 1993, pp. 1476-1481.

(Continued)

*Primary Examiner* — Michael Neff
(74) *Attorney, Agent, or Firm* — Peter Michael Kamarchik; Nicholas J. Pauley; Joseph Agusta (57) ABSTRACT

A method includes executing a first instruction at a processor to perform a first fast Fourier transform (FFT) operation on a set of inputs in a time domain to produce data in a frequency domain, where the set of inputs is in a first order and where the data in the frequency domain is in a second order. The method also includes performing an operation on the data in the frequency domain to produce data in the frequency domain, where the data in the frequency domain is in the second order. The method includes executing a second instruction at the processor to perform a second FFT operation on the data in the frequency domain to produce data in the time domain, where the data in the time domain is in the first order.

17 Claims, 7 Drawing Sheets

(56) References Cited

OTHER PUBLICATIONS

Hopkins, A.B.T. et al. "Transform Digital Signal Processer Architecture Using Optical Interconnections," Proceedings of the 23rd IASTED International Multi-Conference on Parallel and Distributed Computing and Networks, Feb. 15-17, 2005, Austria, pp. 7-12.

Lee, Jaesung et al. "A DSP Architecture for High-Speed FFT in OFDM Systems," ETRI Journal, vol. 24, No. 5, Oct. 2002, pp. 391-397.

Chamberlain et al: "Gray codes, Fast Fourier Transforms and hypercubes", Parallel Computing, Elsevier Publishers, Amsterdam, NL, vol. 6, No. 2, Feb. 1, 1988, pp. 225-233, XP024230242, ISSN: 0167-8191, DOI: 10.1016/0167-8191(88)90087-7 [retrieved on Feb. 1, 1988] section 1.1, 1, 1-3; p. 227, par. 2, 1.5-15.

International Search Report and Written Opinion—PCT/US2012/069383—ISA/EPO—Jul. 22, 2013.

\* cited by examiner

ND FIXED GEOMETRY FAST FOURIER TRANSFORM (FFT)

I. FIELD

The present disclosure is generally related to a fixed geometry fast Fourier transform (FFT).

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Computing operations performed by wireless telephones include signal processing operations. For example, processors in wireless telephones may be adapted to convert input signals from a time domain to a frequency domain, process the input signals in the frequency domain, and convert the processed signals back to the time domain. A Fourier transform is a mathematical algorithm for converting a signal from a time domain to a frequency domain. A fast Fourier transform (FFT) is an efficient algorithm for computing a discrete Fourier transform (DFT) of digitized time domain input signals. A set of data (i.e., input signals) in the time domain may be converted to the frequency domain using a FFT for further signal processing and then converted back to the time domain (e.g., using an inverse FFT (IFFT) operation).

Performance of an FFT operation may be improved by using a divide-and-conquer approach to reduce the number of computations. One such approach is known as a radix-2 algorithm. The radix-2 algorithm takes input data samples two at a time when computing the FFT. To use the radix-2 algorithm in a FFT operation, the number of input samples must be a power of 2. For example, performing a radix-2 FFT on 128 input samples (i.e. a 128-point FFT operation) includes 7 stages of computation. When the radix-2 FFT is performed by a processor, the resultant output data is bit-reversed.

For example, consider performing an 8-point FFT operation where the input data set is received in a normal order (i.e., serial order) 0, 1, 2, 3, 4, 5, 6, and 7 (represented in binary as '000,' '001,' '010,' '011,' '100,' '101,' '110,' and '111,' respectively). After performing a first FFT (e.g., radix-2 FFT) operation to convert the set of input data to the frequency domain, the radix-2 FFT operation produces an output data set where the bits have been bit reversed. Hence, the output data produced from the radix-2 FFT operation is 0, 4, 2, 6, 1, 5, 3, and 7 (i.e., '000,' '100,' '010,' '110,' '001,' '101,' '011,' and '111,' respectively).

Thus, an additional computation stage may reorder the bits back to the normal (i.e., serial) order. This computation stage is known as the bit-reversal stage. The bit-reversal stage may be a bottleneck in a processor because data is handled individually, which may translate to the use of N clock cycles for reordering the data, where N corresponds to the number of data samples being processed. Alternately, the bit-reversal stage may be implemented prior to computing the radix-2 FFT (i.e., before the input data set is fed into the radix-2 FFT) so that the FFT output may be produced in a normal order. The bit-reversal stage may cause a strain on processing resources and consume battery life of a wireless device.

III. SUMMARY

A system and method of using dual fixed geometry FFT operations that may reduce system complexity and power consumption of a processor is disclosed. The disclosed system and method may perform a fixed geometry FFT operation without use of a dedicated bit-reversal stage. According to the disclosed embodiments, both a shuffle input/output network and a deal input/output network may be implemented and may use a common data processing path. A first instruction may use the common data path and one of the shuffle input/output network and the deal input/output network, and a second instruction may use the common data path and the other of the shuffle input/output network and the deal input/output network.

In a particular embodiment, a method includes executing a first instruction at a processor to perform a first fast Fourier transform (FFT) operation on a set of inputs in a time domain to produce data in a frequency domain, where the set of inputs is in a first order and where the data in the frequency domain is in a second order. The method also includes performing an operation (e.g., a filtering operation) on the data in the frequency domain to produce data in the frequency domain, where the data in the frequency domain is in the second order. The method includes executing a second instruction at the processor to perform a second FFT operation (e.g., an inverse FFT) on the data in the frequency domain to produce data in the time domain, where the data in the time domain is in the first order.

In another particular embodiment, an apparatus includes a memory that stores a first instruction and a second instruction and a processor coupled to the memory. The processor is configured to execute the first instruction to perform a first fast Fourier transform (FFT) operation on a set of inputs in a time domain to produce data in a frequency domain, where the set of inputs is in a first order and where the data in the frequency domain is in a second order. The processor is configured to perform an operation on the data in the frequency domain to produce data in the frequency domain, where the data in the frequency domain is in the second order. The processor is also configured to execute the second instruction to perform a second FFT operation on the data in the frequency domain to produce data in the time domain, where the data in the time domain is in the first order.

In another particular embodiment, an apparatus includes means for storing a first instruction and a second instruction and means for processing the first instruction and the second instruction. The means for processing includes means for executing the first instruction to perform a first fast Fourier transform (FFT) operation on a set of inputs in a time domain to produce data in a frequency domain, where the set of inputs is in a first order and where the data in the frequency domain is in a second order. The means for processing includes means for performing an operation on the data in the frequency domain to produce data in the frequency domain, where the data in the frequency domain is in the second order. The means for processing also includes means for executing the second instruction to perform a second FFT operation on the data in the frequency domain to produce data in the time domain, where the data in the time domain is in the first order.

In another particular embodiment, a non-transitory computer-readable medium includes program code that, when executed by a processor, causes the processor to execute a first instruction to perform a first fast Fourier transform (FFT) operation on a set of inputs in a time domain to produce data in a frequency domain, where the set of inputs is in a first order and where the data in the frequency domain is in a second order. The program code causes the processor to perform an operation on the data in the frequency domain to produce data in the frequency domain, where the data in the frequency domain is in the second order. The program code also causes the processor to execute a second instruction to perform a second FFT operation on the data in the frequency domain to produce data in the time domain, where the data in the time domain is in the first order.

In another particular embodiment, a method includes executing a bit-reversal instruction with respect to input data stored at a memory coupled to a processor to produce output data that is a bit-reversal of the input data. The processor includes a shuffle input/output network and a deal input/output network and the bit-reversal instruction is executed in connection with one of the shuffle input/output network and the deal input/output network.

One particular advantage provided by at least one of the disclosed embodiments is the elimination of the bit-reversal stage for an implementation of a radix-2 FFT algorithm. Eliminating the bit-reversal stage may lead to a reduction in execution cycles to perform bit-reversal, a reduction in power consumption, and a reduction of hardware area used by a processor that implements the radix-2 FFT.

Other aspects, advantages, and features of the present disclosure will become apparent after review of the entire application, including the following sections: Brief Description of the Drawings, Detailed Description, and the Claims.

V. DETAILED DESCRIPTION

Figure 1:
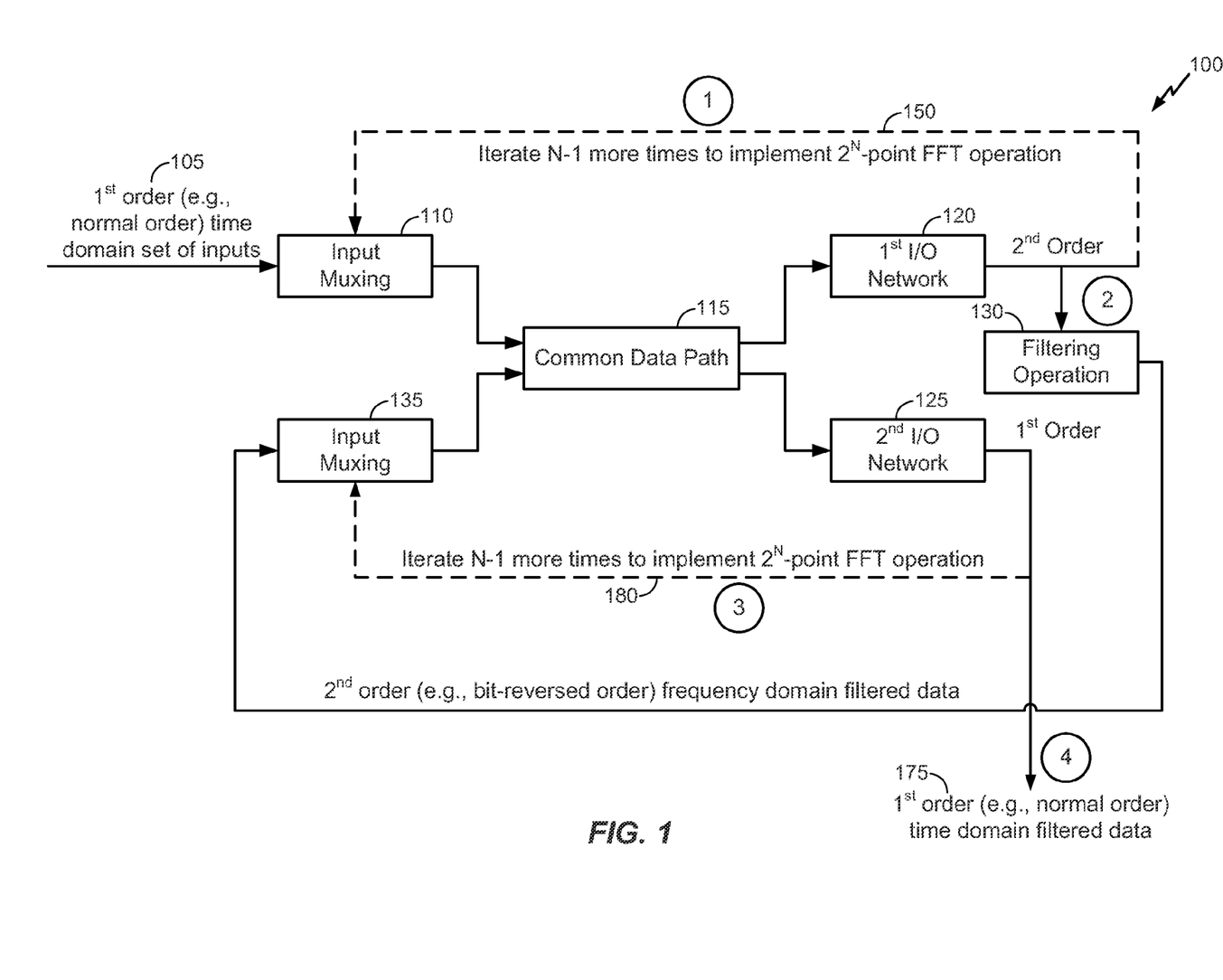
FIG. 1 is a diagram that illustrates execution of a first instruction to perform a first FFT operation on a set of inputs, performing a filtering operation, and executing a second instruction to perform a second FFT operation.

Referring to FIG. 1, a diagram that illustrates execution of a dual fixed geometry FFT operation is disclosed and generally designated 100. For example, a first instruction may be executed on a set of inputs and an operation (e.g., a filtering operation) may be performed on the output of the first instruction. A second instruction may be executed on the output of the filtering operation. In a particular embodiment, the system illustrated in FIG. 1 may be integrated into a processor (e.g., a single instruction multiple data (SIMD) processor).

The first instruction may be a "r2fftnb" instruction and the second instruction may be a "r2fftbn" instruction (or vice versa), where "r2fft" indicates that a radix-2 FFT algorithm is implemented (i.e., 2 samples are taken at a time from the set of inputs), where "nb" indicates that the first instruction accepts the inputs in a normal order (e.g., in a sequential order) and outputs data in a bit-reversed order, and where "bn" indicates that the second instruction accepts inputs in a bit-reversed order and outputs data in a normal order. Further, execution of the first instruction (i.e., one of the "r2fftnb" instruction and the "r2fftbn" instruction) may include using a common data path of a processor in conjunction with one of a shuffle input/output network and a deal input/output network, and execution of the second instruction (i.e., the other of the "r2fftnb" instruction and the "r2fftbn" instruction) may include using the common data path of the processor in conjunction with the other of the shuffle input/output network and the deal input/output network.

As illustrated in FIG. 1, during execution of the first instruction (e.g., the "r2fftnb" instruction), a set of inputs in a time domain may be fetched from a memory (not shown) for processing. In a particular embodiment, the set of inputs may be in a first order 105 (e.g., in a normal order) and may be received at the common data path 115 via an input multiplexer (or multiplexing circuitry) 110. The first instruction is executable to perform a first FFT operation on the set of inputs 105.

The first FFT operation may include multiple computation stages based on a size of the set of inputs, where 2 samples from the set of inputs are processed at a time (i.e., radix-2). In alternate embodiments, a different number of samples may be processed at a time (e.g., radix-4, radix-8, or radix-n where n is a power of 2). For example, the first instruction may include N iterations for a $2^N$-point FFT operation, where N is an integer greater than zero. To illustrate, a 128-point FFT operation may include 7 (i.e., $128=2^7$) iterations (i.e., computation stages) of the first FFT operation. As another example, a 2-point FFT may be implemented (i.e., $2=2^1$) in 1 iteration of the first and second instruction. Accordingly, any number of iterations of the first or second instructions may be performed depending on an X-point FFT desired, where X is a power of 2 (e.g., 8 iterations for 256-point FFT, 9 iterations for 512-point FFT, 10 iterations for 1024-point FFT, etc.). Thus, each iteration of the first FFT operation may include the input muxing 110, the common data path 115, and a first output network 120, where the first output network 120 is one of the shuffle input/output network and the deal input/output network described with reference to FIG. 2 and FIG. 3, respectively. After the 7 iterations (designated '1') of the first FFT operation have been completed, output data (designated '2') may be generated. The output data may be in a second order (e.g., in a bit-reversed order) and in a frequency domain. The bit-reversed frequency domain data may be filtered via a filtering operation 130. An output of the filtering operation 130 may be provided as an input via input muxing 135 for the second instruction. The output of the filtering operation 130 may also be in the second order (e.g., bit-reversed).

During execution of the second instruction (e.g., the "r2fftbn" instruction), 7 iterations may be performed on second order (i.e., bit-reversed) frequency domain data. Each iteration may include use of input muxing 135, the common data path 115, and a second output network 125. The second output network 125 may be the other of the shuffle input/output network and the deal input/output network. For example, if the first instruction uses the shuffle input/output network, the second instruction may use the deal input/output network and vice versa. It should be noted that input muxing 110 and input muxing 135 may be implemented using a single multiplexer or multiplexing circuitry or different multiplexers or multiplexing circuitry. After the 7 iterations (designated '3') of the second FFT operation have been completed, output data (designated '4') may be generated in the first order, representing desired normal order time domain filtered data 175. Thus, each of the first instruction and the second instruction may be executable to perform at least one of a decimation in time (DIT) operation (i.e., using time indices of a signal) and a decimation in frequency (DIF) operation (i.e., using discrete frequency indices of a signal).

Thus, by executing the first instruction (e.g., one of the "r2fftnb" instruction and the "r2fftbn" instruction) in conjunction with the first output network 120 (e.g., one of the shuffle input/output network and the deal input/output network) and executing the second instruction (e.g., the other of the "r2fftnb" instruction and the "r2fftbn" instruction) in conjunction with the second output network 125 (e.g., the other of the shuffle input/output network and the deal input/output network), a dual fixed geometry FFT operation may be implemented without use of a dedicated bit-reversal stage. Eliminating the bit-reversal stage in an implementation of a radix-2 FFT algorithm may reduce execution cycles, power consumption, and hardware area.

Figure 2:
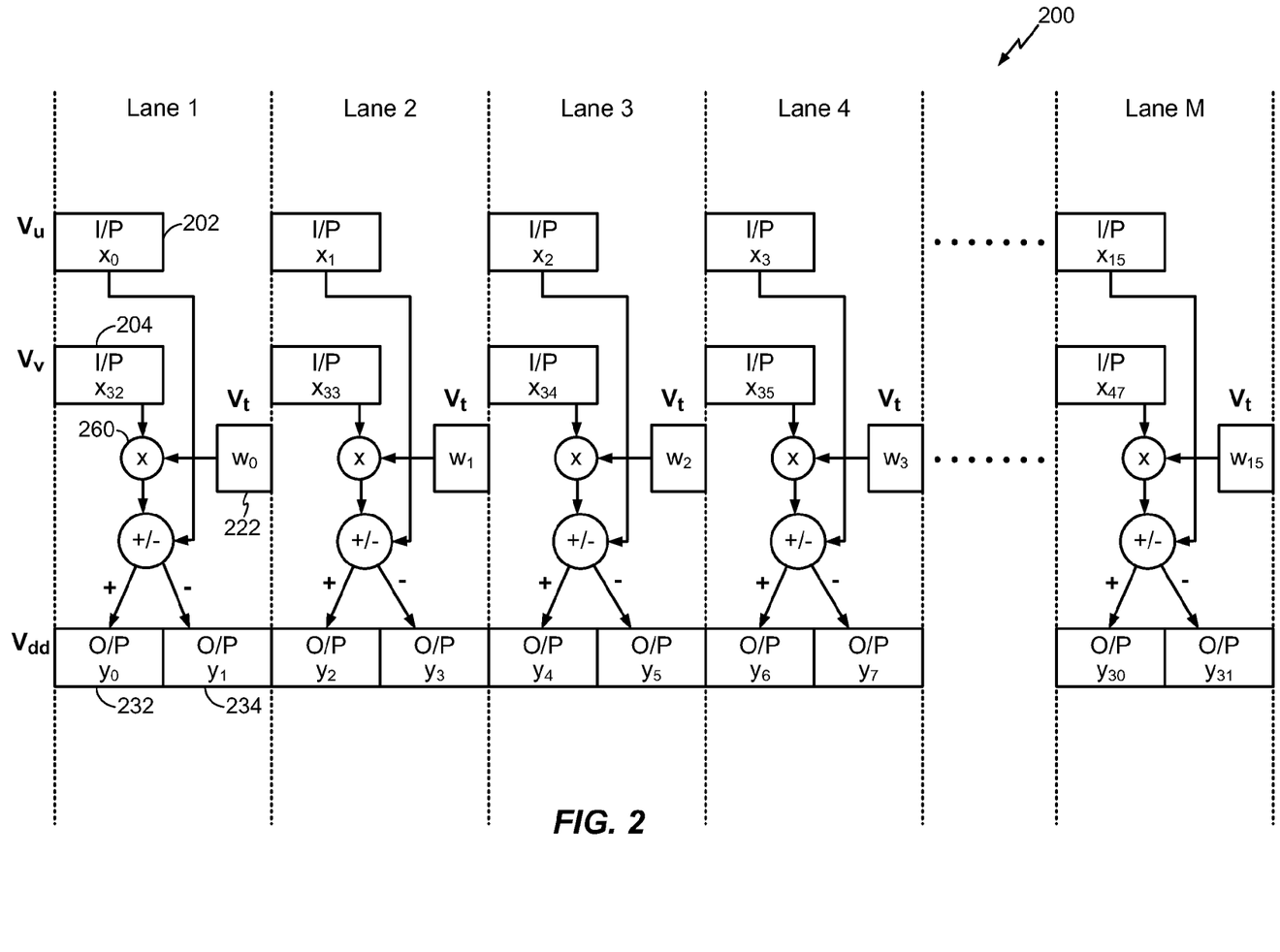
FIG. 2 is an embodiment of a system that includes a shuffle input/output network for performing a first FFT operation or a second FFT operation.

Referring to FIG. 2, a particular illustrative embodiment of a system that includes a shuffle input/output network for performing a dual fixed geometry FFT operation is disclosed and generally designated 200. For example, an FFT instruction (e.g., one of the "r2fftnb" instruction and the "r2fftbn" instruction) may be executed on a set of inputs in conjunction with the shuffle input/output network 200.

The shuffle input/output network 200 may include a plurality of computation lanes. For example, in the embodiment of FIG. 2, the shuffle input/output network 200 includes M computation lanes (designated Lane 1, Lane 2 . . . Lane M). In a particular embodiment, the shuffle input/output network 200 includes sixteen (16) computation lanes (i.e., M=16). Each computation lane may include a first input register $V_u$, a second input register $V_v$, a third input register $V_t$, and an output register $V_{dd}$, as shown. In a particular embodiment, the first input register $V_u$ and the second input register $V_v$ each include N data samples. For example, the first input register $V_u$ may include sixteen (16) data samples (e.g., $x_0, x_1 \ldots x_{15}$) and the second input register $V_v$ may include sixteen (16) data samples (e.g., $x_{32}, x_{33} \ldots X_{47}$). Thus, in this example, the first input register $V_u$ and the second input register $V_v$ each include N=16 data samples. In another particular embodiment, the output register $V_{dd}$ includes 2N data samples. For example, the output register $V_{dd}$ may include 32 (i.e., 2N=32) data samples (e.g., $y_0, y_1 \ldots y_{31}$). The first input register $V_u$ and the second input register $V_v$ may provide input data samples (e.g., 2 data samples at a time for radix-2 FFT) and the third input register $V_t$ may provide a twiddle factor 'w' to be used in the butterfly computations of the FFT algorithm, where the twiddle factor 'w' is a complex multiplicative constant (or coefficient). When the twiddle factor 'w' is equal to one, the FFT algorithm may be a fast Hadamard transform (FHT).

During operation at the shuffle input/output network 200, butterfly computations may be performed in parallel at each of a plurality of computation lanes. In each computation lane, during each iteration, a first input data sample from the first input register $V_u$ is added to a result of multiplying a second input data sample (i.e., complex multiplication) with the twiddle factor 'w', and the result of the complex multiplication is subtracted from the first input data sample to produce outputs that are stored in the output register $V_{dd}$ of the computation lane. For example, in Lane 1, a second input data sample, $x_{32}$ 204 may be multiplied (e.g., using a multiplier 260) with a twiddle factor $w_0$ 222 (i.e., complex multiplication) and a result of the complex multiplication may be added to a first input data sample $x_0$ 202 to produce first output data $y_0$ 232. The result of the complex multiplication may be subtracted from the first input data sample $x_0$ 202 to produce second output data $y_1$ 234 stored in the output register $V_{dd}$. Thus, the first output data 232 may be expressed as $y_{0\ 1} = x_0 + (x_{32} * w_0)$ and the second output data 234 may be expressed as $y_1 = x_0 - (x_{32} * w_0)$. Similar computations may be performed in parallel in Lanes 2-M.

Thus, the shuffle input/output network 200 may combine ("shuffle") inputs from two registers to obtain an output stored at a single output register. Accordingly, a radix-2 FFT instruction (e.g., "r2fftnb" instruction) that accepts input in a normal order may utilize the shuffle input/output network 200 to produce output in a bit-reversed order.

Figure 3:
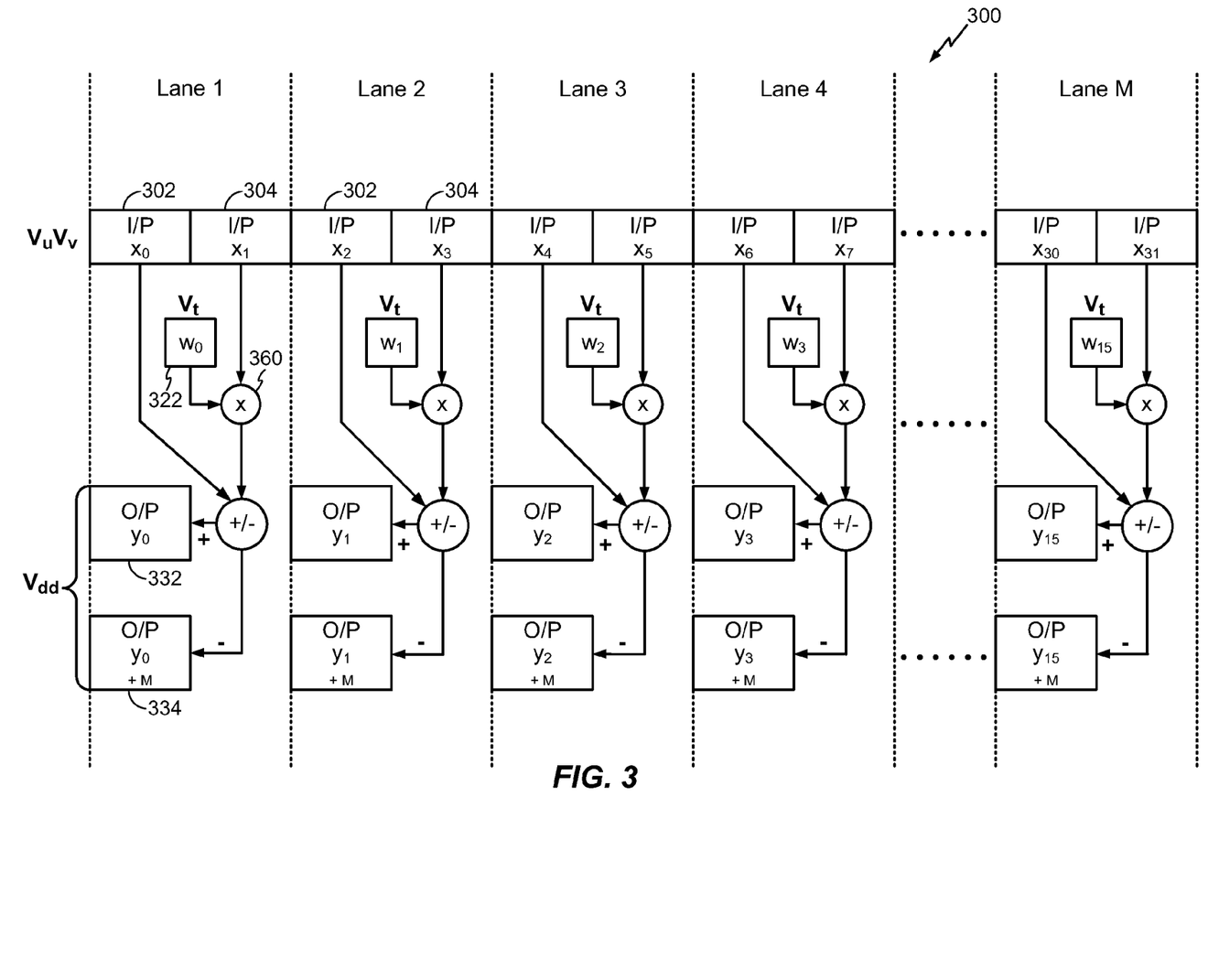
FIG. 3 is an embodiment of a system that includes a deal input/output network for performing a first FFT operation or a second FFT operation.

Referring to FIG. 3, a particular illustrative embodiment of a system that includes a deal input/output network for performing a dual fixed geometry FFT operation is disclosed and generally designated 300. For example, an FFT instruction (e.g., one of the "r2fftnb" instruction and the "r2fftbn" instruction) may be executed on a set of inputs in conjunction with the deal input/output network 300.

The deal input/output network may include a plurality of computation lanes. For example, in the embodiment of FIG. 3, the deal input/output network 300 includes M computation lanes (designated Lane 1, Lane 2 . . . Lane M). In a particular embodiment, the deal input/output network includes sixteen (16) computation lanes (i.e., M=16). Each computation lane may include a first input register $V_u$, a second input register $V_v$, a third input register $V_t$, and an output register pair $V_{dd}$, as shown. The first input register $V_u$ and the second input register $V_v$ may be an input register pair providing two input samples at a time. In a particular embodiment, the first input register $V_u$ and the second input register $V_v$ each include N data samples. In another particular embodiment, each register of the output register pair $V_{dd}$ includes N data samples. The first input register $V_u$ and the second input register $V_v$ may provide the set of inputs (e.g., 2 data samples at a time for radix-2 FFT) and the third input register $V_t$ may provide a twiddle factor 'w' to be used in the butterfly computations of the FFT algorithm, where the twiddle factor 'w' is a complex multiplicative constant (or coefficient). When the twiddle factor 'w' is equal to one, the FFT algorithm may be a fast Hadamard transform (FHT).

During operation at the deal input/output network 300, butterfly computations may be performed in parallel at each of a plurality of computation lanes. In each computation lane, during each iteration, a first input data sample from the first input register $V_u$ is added to a result of multiplying a second input data sample (from the second input register $V_v$) with the twiddle factor 'w' (i.e., complex multiplication), and the result of the complex multiplication is subtracted from the first input data sample to produce first output data and second output data, respectively, stored in each register of the output register pair $V_{dd}$ of the computation lane. For example, in Lane 1, a second input data sample $x_1$ 304 provided by the second input data $V_v$ may be multiplied (e.g., using a multiplier 360) with a twiddle factor $w_0$ 322 (i.e., complex multiplication) provided by the third input register $V_t$ and a result of the complex multiplication may be added to a first input data sample $x_0$ 302 to produce first output data 332. The result of the complex multiplication may be subtracted from the first input data sample $x_0$ 302 to produce second output data 334 stored in the output register pair $V_{dd}$. Thus, the first output data 332 may be expressed as $y_0=x_0+(x_1*w_0)$ and the second output data 334 may be expressed as $y_{0+m}=x_0-(x_1*W_0)$ (where M=number of computation lanes, e.g., 16). Similar computations may be performed in parallel in Lanes 2-M.

Thus, the deal input/output network 300 may "deal" inputs from one register to obtain a first output and a second output stored at an output register pair. Accordingly, a radix-2 FFT instruction (e.g., "r2fftbn" instruction) that accepts input in a bit-reversed order may utilize the deal input/output network 300 to produce output in a normal order.

In a particular embodiment, inclusion of both the shuffle input/output network 200 of FIG. 2 and the deal input/output network 300 of FIG. 3 may enable implementation of a bit-reversal instruction. For example, a bit-reversal instruction "bitrevnb" may accept input data in serial (i.e., normal) order and may produce as output a bit-reversed version of the input data by passing the input data through the shuffle input/output network 200 of FIG. 2 (without performing any FFT mathematical operations such as complex additions and multiplications using the twiddle factor 'w'). Similarly, a bit-reversal instruction "bitrevbn" may accept input data in bit-reversed order and may produce as output a serial order version of the input data by passing the input data through the deal input/output network 300 of FIG. 3 (without performing any FFT mathematical operations such as complex additions and multiplications using the twiddle factor 'w').

Figure 4:
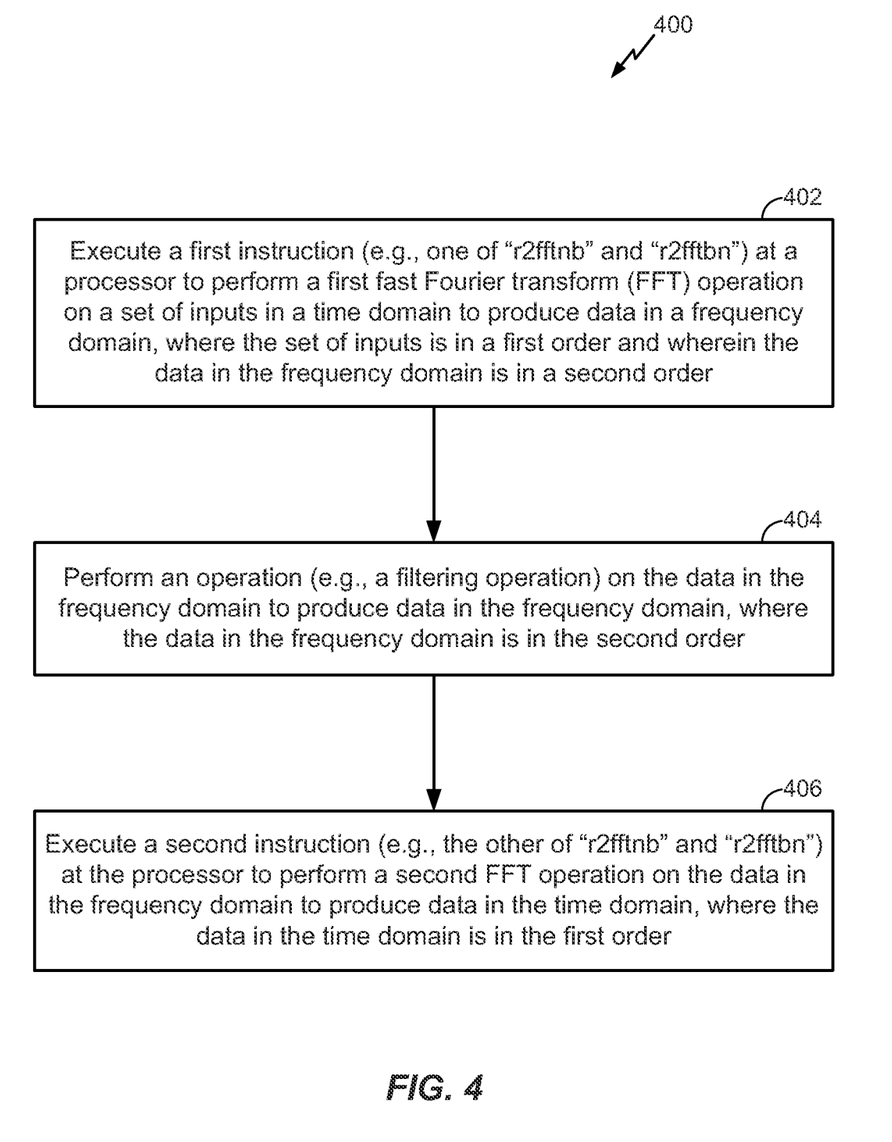
FIG. 4 is a flow chart of a particular illustrative embodiment of a method of executing a first instruction to perform a first FFT operation on a set of inputs, performing a filtering operation, and executing a second instruction to perform a second FFT operation.

Referring to FIG. 4, a particular illustrative embodiment of a method of executing a first instruction to perform a first FFT operation on a set of inputs, performing a filtering operation to produce filtered data, and executing a second instruction to perform a second FFT operation on the filtered data is disclosed and generally designated 400. In an illustrative embodiment, the method 500 may be illustrated with reference to FIGS. 1-3.

The method 400 includes executing a first instruction (e.g., one of a "r2fftnb" instruction and a "r2fftbn" instruction) at a processor to perform a first FFT operation on a set of inputs in the time domain to produce data in a frequency domain, where the set of inputs is in a first order and where the data in the frequency domain is in a second order, at 402. For example, a set of inputs in the time domain may be stored in a memory and the first instruction (e.g., the "r2fftnb" instruction) may be executed on the set of inputs by using a common data path of the processor (e.g., common data path 115 of FIG. 1) in conjunction with a first output network (e.g., the shuffle input/output network 200 of FIG. 2) to produce data in a frequency domain. In a particular embodiment, the set of inputs provides 2 samples at a time (i.e., radix-2) from a first input register (e.g., the first input register $V_u$ of FIG. 2) and a second input register (e.g., the second input register (e.g., the second input register $V_v$ of FIG. 2). In another particular embodiment, the set of inputs is in a first order (e.g., a normal order) and the data in the frequency domain (i.e., output of execution of the "r2fftnb" instruction) is in a second order (e.g., a bit-reversed order).

The method 400 also includes performing a filtering operation on the data in the frequency domain to produce filtered data in the frequency domain, where the filtered data in the frequency domain is in the second order, at 404. For example, a filtering instruction may be executed on the data in the frequency domain to produce filtered data in the frequency domain, where the filtered data in the frequency domain is in the bit-reversed order. Examples of filtering operations may include noise reduction in signals (i.e., noise filtering), image filtering, and audio signal processing.

The method 400 includes executing a second instruction (e.g., the other of the "r2fftnb" instruction and the "r2fftbn" instruction) at the processor on the filtered data in the frequency domain to produce filtered data in the time domain, where the filtered data in the time domain is in the first order, at 406. For example, the second instruction (e.g., the "r2fftbn" instruction) may be executed on the bit-reversed frequency domain filtered data by using the common data path of the processor (e.g., the common data path 115 of FIG. 1) in conjunction with a second output network (e.g., the deal input/output network 300 of FIG. 3) to produce filtered data in the time domain, where the filtered data in the time domain is in the normal order. The method 400 of FIG. 4 may be performed at a processor (e.g., processor 600 of FIG. 6 or processor 764 of FIG. 7) that includes the shuffle input/output network 200 of FIG. 2 and the deal input/output network 300 of FIG. 3.

It should be noted that the first instruction may include N iterations to implement a $2^N$-point FFT operation, where N is an integer greater than zero. To illustrate, a 128-point FFT operation may include 7 (i.e., $128=2^7$) iterations (i.e., computation stages) of the first FFT operation. Any number of iterations of the first or second instruction may be performed depending on an X-point FFT desired, where X is a power of 2.

Thus, by executing the first instruction (e.g., the "r2fftnb" instruction) in conjunction with a first output network (e.g., the shuffle input/output network 200) and executing the second instruction (e.g., the "r2fftbn" instruction) in conjunction with the second output network (e.g., the deal input/output network 300), a dual fixed geometry FFT operation may be implemented without use of a dedicated bit-reversal stage. The elimination of the bit-reversal stage may result in a reduction in execution cycles, a reduction in power consumption, and a reduction of hardware area of a processor that implements the radix-2 FFT.

Figure 5:
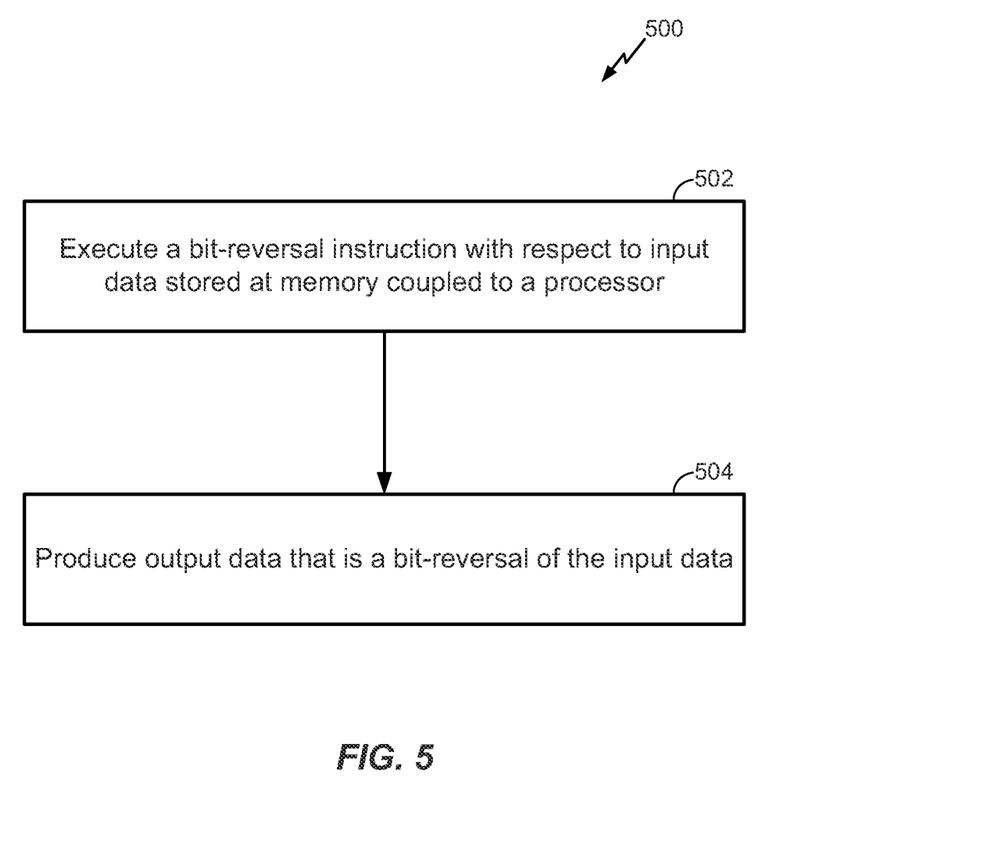
FIG. 5 is a flow chart of a particular illustrative embodiment of a method of executing a bit-reversal instruction with respect to input data stored at a memory coupled to a processor to produce output data that is a bit-reversal of the input data.

Referring to FIG. 5, a particular illustrative embodiment of a method of executing a bit-reversal instruction with respect to input data stored at a memory coupled to a processor to produce output data that is a bit-reversal of the input data is disclosed and generally designated 500.

The method 500 includes executing a bit-reversal instruction with respect to input data stored at a memory coupled to a processor, at 502, and producing output data that is a bit-reversal of the input data, at 504. For example, the bit-reversal instruction may be executed in conjunction with one of the shuffle input/output network 200 and the deal input/output network 300. To illustrate, a bit-reversal instruction "bitrevnb" may receive input data in a normal order and may produce output data in a bit-reversed order by passing the input data through the shuffle input/output network 200 of FIG. 2. As another example, a bit-reversal instruction "bitrevbn" may receive input data in a bit-reversed order and may produce output data in normal order by passing the input data through the deal input/output network 300 of FIG. 3. The method 500 of FIG. 5 may thus provide one or more dedicated bit-reversal instructions that are executable to rearrange data stored in a memory (e.g., from normal order to bit-reversed order or vice versa). In a particular embodiment, a bit reversal instruction "bitrev (rd, rs)" executed at a processor (e.g., processor 600 of FIG. 6 or processor 764 of FIG. 7) may receive input data from a source register 'rs' in a normal order, pass the input data through the shuffle input/output network 200, and produce a bit-reversed output data that is stored in a destination register 'rd.' In another particular embodiment, a bit reversal instruction "bitrev (rd, rs)" executed at a processor (e.g., processor 600 of FIG. 6 or processor 764 of FIG. 7) may receive bit-reversed input data from a source register 'rs,', pass the input data through the deal input/output network 300, and produce normal order output data that is stored in a destination register 'rd.'

It should be noted that the method 400 of FIG. 4 and the method 500 of FIG. 5 may be implemented by a field-programmable gate array (FPGA) device, an application-specific integrated circuit (ASIC), a processing unit such as a central processing unit (CPU), a digital signal processor (DSP), a controller, another hardware device, firmware, or any combination thereof. As an example, the method 400 of FIG. 4 and the method 500 of FIG. 5 may be performed by a processor or component thereof that executes program code or instructions, as described with respect to FIGS. 1-3 and FIG. 6.

Figure 6:
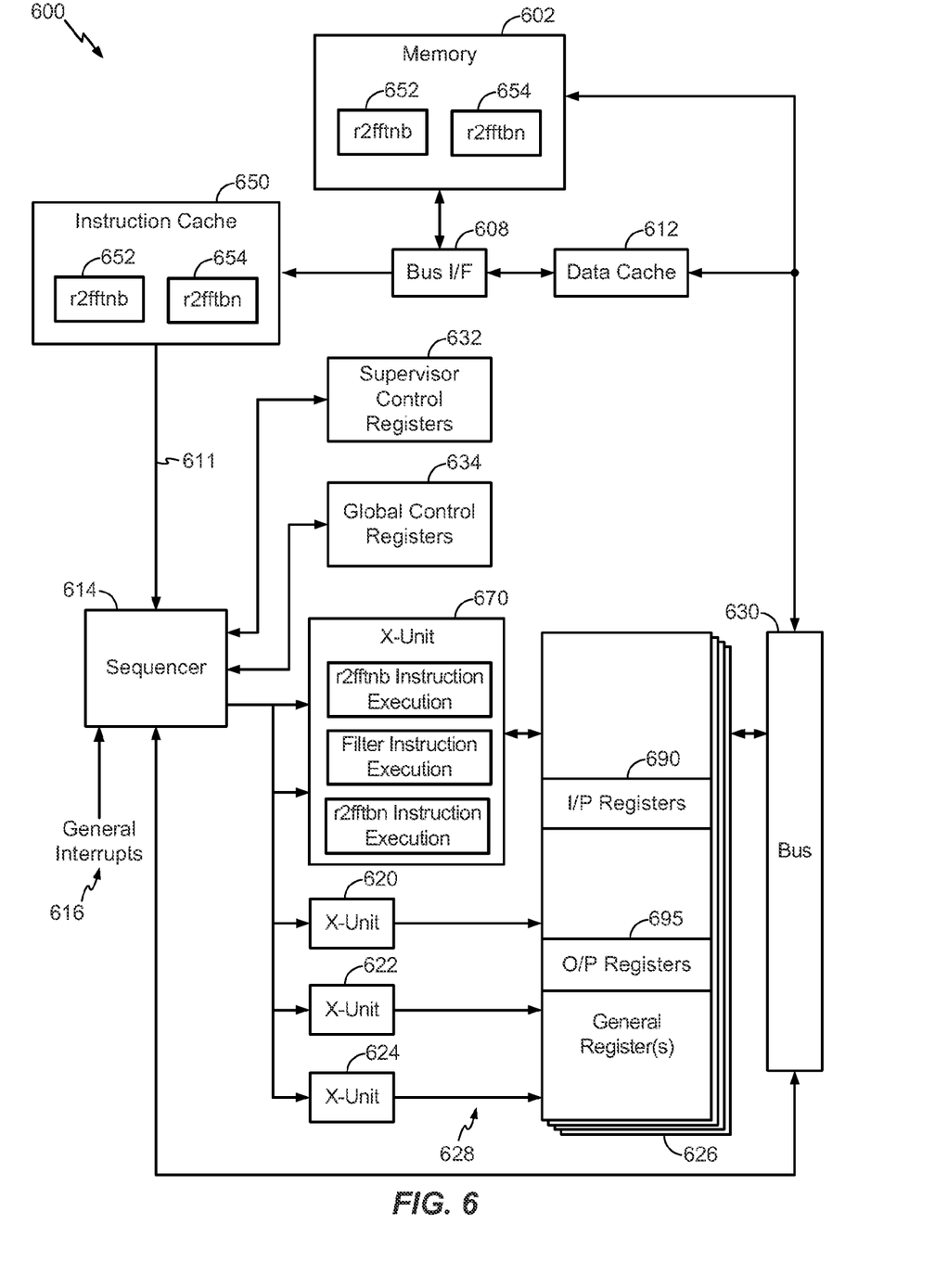
FIG. 6 is an embodiment of a system that includes a memory storing a first FFT instruction and a second FFT instruction and a processor to execute the first FFT instruction on a set of inputs, perform a filtering operation, and execute the second FFT instruction.

Referring to FIG. 600, a particular illustrative embodiment of a system that includes a memory 602 storing a first FFT instruction and a second FFT instruction (e.g., "r2fftnb" instruction 652 and "r2fftbn" instruction 654) and a processor to execute the first FFT instruction on a set of inputs, perform a filtering operation, and execute the second FFT instruction is disclosed and generally designated 600.

The memory 602 may be coupled to an instruction cache 650 via a bus interface 608. In a particular embodiment, all or a portion of the system 600 may be integrated into a processor. Alternately, the memory 602 may be external to the processor. The memory 602 may send the "r2fftnb" instruction 652 and the "r2fftbn" instruction 654 to the instruction cache 650 via the bus interface 608. The "r2fftnb" instruction 652 and the "r2fftbn" instruction 654 may be executed on a set of inputs stored in an input register 690 to produce output data stored in an output register 695. Input register 690 and output register 695 may be part of a general register file 626. Alternately, the set of inputs may be stored in a data cache 612 or the memory 602. It should be noted that although the input registers 690 and the output registers 695 are illustrated separately, the input registers 690 and the output registers 695 may include one or more common registers (i.e., registers that function as both input and output registers). Moreover, there may be any number of input registers 690 and output registers 695.

The instruction cache 650 may be coupled to a sequencer 614 via a bus 611. The sequencer 614 may receive general interrupts 616, which may be retrieved from an interrupt register (not shown). In a particular embodiment, the instruction cache 650 may be coupled to the sequencer 614 via a plurality of current instruction registers (not shown), which may be coupled to the bus 611 and associated with particular threads (e.g., hardware threads) of the processor 600. In a particular embodiment, the processor 600 may be an interleaved multi-threaded processor including six (6) threads.

In a particular embodiment, the bus 611 may be a one-hundred and twenty-eight bit (128-bit) bus and the sequencer 614 may be configured to retrieve instructions from the memory 610 via instruction packets, including the "r2fftnb" instruction 652 and the "r2fftbn" instruction 654, having a length of thirty-two (32) bits each. The bus 611 may be coupled to a first instruction execution unit 670, a second instruction execution unit 620, a third instruction execution unit 622, and a fourth instruction execution unit 624. One or more of the execution units 670, 620, 622, and 624 may be configured to perform a first FFT operation (e.g., by executing one of the "r2fftnb" instruction 652 and the "r2fftbn" instruction 654), to perform a filtering operation (e.g., by executing a filter instruction), and to perform a second FFT operation (e.g., by executing the other of the "r2bfftnb" instruction 652 and the "r2fftbn" instruction 654). It should be noted that there may be fewer or more than four instruction execution units. Each instruction execution unit 670, 620, 622, and 624 may be coupled to the general register file 626 via a second bus 628. The general register file 626 may also be coupled to the sequencer 614, the data cache 612, and the memory 602 via a third bus 630. In a particular embodiment, one or more of the execution units 670, 620, 622, and 624 may be load/store units.

The system 600 may also include supervisor control registers 632 and global control registers 634 to store bits that may be accessed by control logic within the sequencer 614 to determine whether to accept interrupts (e.g., the general interrupts 616) and to control execution of instructions.

In a particular embodiment, the instruction cache 610 may issue a first instruction (e.g., the "r2fftnb" instruction 652) to any of the execution units 670, 620, 622, and 624. For example, the execution unit 670 may receive the "r2fftnb" instruction 652 and may execute the "r2fftnb" instruction 652 to perform a first FFT operation on a set of inputs in a time domain to produce data in a frequency domain. The set of inputs may be stored in any of the input registers 690 and sent to the execution unit 670 during execution of the first instruction. Alternately, or in addition, the set of inputs may be stored in the memory 602 or the data cache 612. Further, the set of inputs may be in a first order (e.g., a normal order) and the data in the frequency domain may be in a second order (i.e., in a bit-reversed order). The data in the frequency domain (i.e., the output produced from execution of the "r2fftnb" instruction) may be stored in any of the output registers 695. The execution unit 670 may execute the "r2fftnb" instruction 652 in conjunction with a first input/output network 120 (e.g., the shuffle input/output network 200 of FIG. 2) of the processor 600.

In another particular embodiment, the instruction cache 610 may issue a filtering instruction (not shown) to any of the execution units 670, 620, 622, and 624. For example, the execution unit 670 may execute the filtering instruction to perform a filtering operation on the data in the frequency domain to produce filtered data in the frequency domain. To illustrate, any of execution units 670, 620, 622, and 624 may receive the data in the frequency domain from the output registers 695 during execution of the filtering instruction and may store the frequency domain filtered data in other output registers 695 or other registers of the processor 600. The filtered data in the frequency domain may be in the second order (e.g., a bit-reversed order).

In a particular embodiment, the instruction cache 610 may issue a second instruction (e.g., the "r2fftbn" instruction 654) to any of the execution units 670, 620, 622, and 624. For example, the execution unit 670 may receive the "r2fftbn" instruction 654 and may execute the "r2fftbn" instruction 654 to perform a second FFT operation on the filtered data in the frequency domain to produce filtered data in the time domain. Similar to execution of the first instruction and the filtering operation, execution of the second instruction may include storing and/or retrieving data from the input registers 690 and/or the output registers 695. The resulting filtered data in the time domain may be in the first order (i.e., the normal order). Further, the execution unit 670 may execute the "r2fftbn" instruction 654 in conjunction with a second input/output network 125 (e.g., the deal input/output network 300 of FIG. 3) of the processor 600.

Thus, the system 600 of FIG. 6 may avoid use of a dedicated bit-reversal stage by executing the first instruction (e.g., the "r2fftnb" instruction) in conjunction with a first output network (e.g., the shuffle input/output network 200) and executing the second instruction (e.g., the "r2fftbn" instruction) in conjunction with the second output network (e.g., the deal input/output network 300). Elimination of a dedicated bit-reversal stage may result in a reduction in execution cycles, a reduction in power consumption, and a reduction of hardware area.

Figure 7:
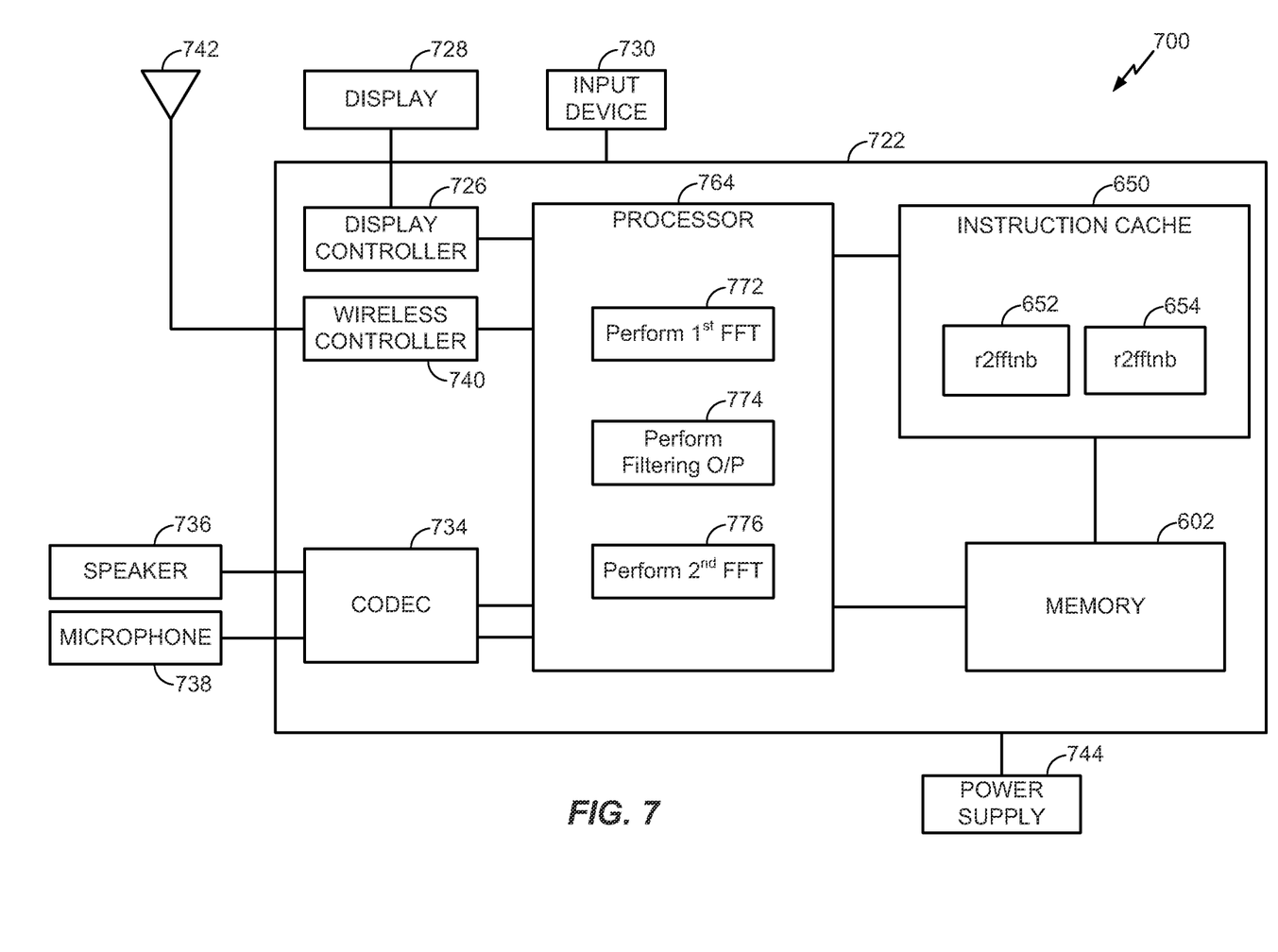
FIG. 7 is a block diagram of a wireless device including a processor operable to execute a first FFT instruction on a set of inputs, perform a filtering operation, and execute a second FFT operation.

Referring to FIG. 7, a block diagram of a particular illustrative embodiment of a wireless device that includes a processor operable to execute a first FFT instruction on a set of inputs, perform a filtering operation, and execute a second FFT operation is depicted and generally designated 700. The device 700 includes a memory 602 coupled to an instruction cache 650 and to a processor 764. The memory 602 may include program code executable by the processor 764, such as a first instruction and a second instruction (e.g., the "r2fftnb" instruction 652 and the "r2fftbn" instruction 654). Alternately, the instruction cache 650 may include the first instruction and the second instruction, as shown.

The processor 764 may execute the first instruction (e.g., one of the "r2fftnb" instruction 652 and the "r2fftbn" instruction 654) to perform a first FFT operation 772, perform a filtering operation 774, and execute the second instruction (e.g., the other of the "r2fftnb" instruction 652 and the "r2fftbn" instruction 654) to perform a second FFT operation 776. For example, the processor 764 may execute the "r2fftnb" instruction 652 on a set of inputs (e.g., stored in the memory 602) in a time domain in conjunction with the common data path 115 of FIG. 1 and the shuffle input/output network 200 of FIG. 2, both of which may be implemented within the processor 764, to produce data in a frequency domain. In a particular embodiment, the set of inputs is in a normal order and the data in the frequency domain is in a bit-reversed order. The processor 764 may perform a filtering operation 774 on the bit-reversed frequency domain data to produce filtered data in the frequency domain (and bit-reversed order). The processor 764 may also execute the "r2fftbn" instruction 654 on the bit-reversed frequency domain filtered data in conjunction with the common data path 115 of FIG. 1 and the deal input/output network 300 of FIG. 3, both of which may be implemented within the processor 764, to produce normal order filtered data in the time domain.

FIG. 7 also shows a display controller 726 that is coupled to the processor 764 and to a display 728. A coder/decoder (CODEC) 734 can also be coupled to the processor 764. A speaker 736 and a microphone 738 can be coupled to the CODEC 734.

FIG. 7 also indicates that the wireless controller 740 can be coupled to the processor 764 and to a wireless antenna 742. In a particular embodiment, the processor 764, the display controller 726, the memory 602, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the wireless antenna 742, and the power supply 744 are external to the system-on-chip device 722. However, each of the display 728, the input device 730, the speaker 736, the microphone 738, the wireless antenna 742, and the power supply 744 can be coupled to a component of the system-on-chip device 722, such as an interface or a controller.

It should be noted that although FIG. 7 depicts a wireless communications device, the processor 764 and the memory 602 may also be integrated into other electronic devices, such as a set top box, a music player, a video player, an entertainment unit, a navigation device, a personal digital assistant (PDA), a fixed location data unit, a mobile (e.g., laptop or tablet) computer, or a stationary computer.

In conjunction with the described embodiments, an apparatus is disclosed that includes means for storing a first instruction and a second instruction. For example, the means for storing may include the memory 602 of FIGS. 6-7, the instruction cache 650 of FIGS. 6-7, one or more devices configured to store instructions, or any combination thereof.

The apparatus may also include means for processing the first instruction and the second instruction. For example, the means for processing the instructions may include one or more of the execution units 670, 620, 622, and 624 of FIG. 6, the processor 764 of FIG. 7, one or more devices configured to process instructions, or any combination thereof.

The means for processing may include means for executing a first instruction to perform a first fast Fourier transform (FFT) operation on a set of inputs in a time domain to produce data in a frequency domain, where the set of inputs is in a first order and where the data in the frequency domain is in a second order. For example, the means for executing a first instruction may include the common data path 115 of FIG. 1, the first input/output network 120 of FIG. 1, the second input/output network 125 of FIG. 1, the shuffle input/output network 200 of FIG. 2, the deal input/output network 300 of FIG. 3, one or more of the execution units 670, 620, 622, and 624 of FIG. 6, the processor 764 of FIG. 7, one or more devices configured to execute an instruction, or any combination thereof.

The means for processing may also include means for performing an operation on the data in the frequency domain to produce data in the frequency domain, where the data in the frequency domain is in the second order. For example, the means for performing an operation may include one or more of the execution units 670, 620, 622, and 624 of FIG. 6, the processor 764 of FIG. 7, one or more devices configured to perform an operation, or any combination thereof.

The means for processing may include means for executing a second instruction to perform a second FFT operation on the data in the frequency domain to produce data in the time domain, where the data in the time domain is in the first order. For example, the means for executing the second instruction may include the common data path 115 of FIG. 1, the first input/output network 120 of FIG. 1, the second input/output network 125 of FIG. 1, the shuffle input/output network 200 of FIG. 2, the deal input/output network of FIG. 3, one or more of the execution units 670, 620, 622, and 624 of FIG. 6, the processor 764 of FIG. 7, one or more devices configured to execute an instruction, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
executing a first instruction via a processor to perform a first fast Fourier transform (FFT) operation on a set of inputs in a time domain to produce first data in a frequency domain, wherein the set of inputs is in a first order and wherein the first data in the frequency domain is in a second order, wherein performing the first FFT operation includes use of a common data path of the processor in conjunction with a first input/output network, and wherein the first input/output network comprises one of a shuffle input/output network and a deal input/output network;
performing an operation on the first data in the frequency domain to produce second data in the frequency domain, wherein the second data in the frequency domain is in the second order; and
executing a second instruction via the processor to perform a second FFT operation on the second data in the frequency domain to produce third data in the time domain, wherein the third data in the time domain is in the first order, wherein the first order is one of a normal input order and a bit-reversed input order and the second order is the other of the normal input order and the bit-reversed input order, wherein performing the second FFT operation includes use of the common data path of the processor in conjunction with a second input/output network, and wherein the second input/output network comprises the other of the shuffle input/output network and the deal input/output network.

2. The method of claim 1, wherein the operation is a filtering operation.

3. The method of claim 1, further comprising iteratively executing the first instruction N times to implement a $2^N$-point FFT operation, performing a filtering operation, and iteratively executing the second instruction N times to implement the $2^N$-point FFT operation, wherein N is an integer greater than zero.

4. The method of claim 3, wherein the $2^N$-point FFT operation comprises at least one of a decimation in time (DIT) operation and a decimation in frequency (DIF) operation.

5. The method of claim 1, wherein the first FFT operation and the second FFT operation each comprise a radix-2 FFT operation that accepts two input samples at a time.

6. The method of claim 5, wherein the radix-2 FFT operation comprises a dual fixed geometry operation, wherein each computation stage of a plurality of computation stages of the first FFT operation and the second FFT operation is identical to each other computation stage of the plurality of computation stages.

7. The method of claim 1, wherein the first instruction and the second instruction are each executable to implement a fast Hadamard transform.

8. The method of claim 1, wherein the common data path is configured to:
receive data from first multiplexing circuitry and second multiplexing circuitry; and
send data to the first input/output network and the second input/output network.

9. An apparatus comprising:
a memory storing a first instruction and a second instruction; and
a processor coupled to the memory, the processor comprising a common data path, a first input/output network, and a second input/output network and configured to perform operations comprising:
executing the first instruction to perform a first fast Fourier transform (FFT) operation on a set of inputs in a time domain to produce first data in a frequency domain, wherein the set of inputs is in a first order and wherein the first data in the frequency domain is in a second order, wherein performing the first FFT operation includes use of the common data path in conjunction with the first input/output network, and wherein the first input/output network comprises one of a shuffle input/output network and a deal input/output network;
performing an operation on the first data in the frequency domain to produce second data in the frequency domain, wherein the second data in the frequency domain is in the second order; and
executing the second instruction to perform a second FFT operation on the second data in the frequency domain to produce third data in the time domain, wherein the third data in the time domain is in the first order, wherein the first order is one of a normal input order and a bit-reversed input order and the second order is the other of the normal input order and the bit-reversed input order, wherein performing the second FFT operation includes use of the common data path in conjunction with the second input/output network, and wherein the second input/output network comprises the other of the shuffle input/output network and the deal input/output network.

10. The apparatus of claim 9, wherein the processor is a single instruction multiple data (SIMD) processor.

11. The apparatus of claim 9, wherein the shuffle input/output network comprises a first input register, a second input register, a third input register, and an output register, wherein a pair of inputs is loaded from the first input register and the second input register, wherein a twiddle factor is loaded from the third input register, and wherein an output of a butterfly computation based on the pair of inputs and the twiddle factor is stored in the output register.

12. The apparatus of claim 9, wherein the deal input/output network comprises a first input register, a second input register, a third input register, and an output register pair, wherein a pair of inputs is loaded from the first input register and the second input register, wherein a twiddle factor is loaded from the third input register, and wherein a pair of outputs of a butterfly computation based on the pair of inputs and the twiddle factor is stored in the output register pair.

13. The apparatus of claim 9, wherein the common data path is configured to:
receive data from first multiplexing circuitry and second multiplexing circuitry; and
send data to the first input/output network and the second input/output network.

14. An apparatus comprising:
means for storing a first instruction and a second instruction; and
means for processing the first instruction and the second instruction, wherein the means for processing comprises:
a common data path;
a first input/output network;
a second input/output network;
means for executing the first instruction to perform a first fast Fourier transform (FFT) operation on a set of inputs in a time domain to produce first data in a frequency domain, wherein the set of inputs is in a first order and wherein the first data in the frequency domain is in a second order, wherein performing the first FFT operation includes use of the common data path in conjunction with the first input/output network, and wherein the first input/output network comprises one of a shuffle input/output network and a deal input/output network;
means for performing an operation on the first data in the frequency domain to produce second data in the frequency domain, wherein the second data in the frequency domain is in the second order; and
means for executing the second instruction to perform a second FFT operation on the second data in the frequency domain to produce third data in the time domain, wherein the third data in the time domain is in the first order, wherein the first order is one of a normal input order and a bit-reversed input order and the second order is the other of the normal input order and the bit-reversed input order, wherein performing the second FFT operation includes use of the common data path in conjunction with the second input/output network, and wherein the second input/output network comprises the other of the shuffle input/output network and the deal input/output network.

15. The apparatus of claim 14, wherein the common data path is configured to:
receive data from first multiplexing circuitry and second multiplexing circuitry; and
send data to the first input/output network and the second input/output network.

16. A non-transitory computer-readable medium including program code that, when executed by a processor comprising a common data path, a first input/output network, and a second input/output network, causes the processor to perform operations comprising:
executing a first instruction at a processor to perform a first fast Fourier transform (FFT) operation on a set of inputs in a time domain to produce first data in a frequency domain, wherein the set of inputs is in a first order, and wherein the first data in the frequency domain is in a second order, wherein performing the first FFT operation includes use of the common data path in conjunction with the first input/output network, and wherein the first input/output network comprises one of a shuffle input/output network and a deal input/output network;
performing an operation on the first data in the frequency domain to produce second data in the frequency domain, wherein the second data in the frequency domain is in the second order; and
executing a second instruction at the processor to perform a second FFT operation on the second data in the frequency domain to produce third data in the time domain, wherein the third data in the time domain is in the first order, wherein the first order is one of a normal input order and a bit-reversed input order and the second order is the other of the normal input order and the bit-reversed input order, wherein performing the second FFT operation includes use of the common data path in conjunction with the second input/output network, and wherein the second input/output network comprises the other of the shuffle input/output network and the deal input/output network.

17. The non-transitory computer-readable medium of claim 16, wherein the common data path is configured to:
receive data from first multiplexing circuitry and second multiplexing circuitry; and
send data to the first input/output network and the second input/output network.

* * * * *